United States Patent [19]

Fukuoka

[11] Patent Number: 5,434,488

[45] Date of Patent: Jul. 18, 1995

[54] DEVICE FOR PREVENTING THE BURNING OF A COIL FOR A BRUSHLESS MOTOR AND CAPABLE OF CONTROLLING THE SPEED OF THE MOTOR

[75] Inventor: Toshiaki Fukuoka, Yonago, Japan

[73] Assignee: Matsushita Electric Industrial Co. Ltd., Kadoma, Japan

[21] Appl. No.: 991,337

[22] Filed: Dec. 16, 1992

[30] Foreign Application Priority Data

Dec. 20, 1991 [JP] Japan .............. 3-105367 U

[51] Int. Cl.⁶ ............................................. H02H 7/08
[52] U.S. Cl. ................................... 318/434; 318/138; 318/254; 361/23; 388/815
[58] Field of Search ............... 318/138, 434, 254, 439; 361/23, 24, 30, 31; 388/809–815, 903; 363/55–56

[56] References Cited

U.S. PATENT DOCUMENTS

| | | | |
|---|---|---|---|
| 3,644,808 | 2/1972 | Farre | 318/138 |
| 3,719,875 | 3/1973 | Holland et al. | 318/439 X |
| 4,030,005 | 6/1977 | Doemen | 318/138 |
| 4,171,532 | 10/1979 | Sloan et al. | 361/13 |
| 4,504,881 | 3/1985 | Woda et al. | 318/434 |
| 4,553,187 | 11/1985 | Burns et al. | 361/31 X |
| 4,578,623 | 3/1986 | Tsukutani et al. | 318/254 |
| 4,947,091 | 8/1990 | Tukuoka | 318/434 |

*Primary Examiner*—David Martin
*Attorney, Agent, or Firm*—Renner, Otto, Boisselle & Sklar

[57] ABSTRACT

A device for preventing the burning of a coil for a brushless motor and capable of controlling the speed of the motor is disclosed. The device comprises a capacitor for storing a potential, a detection circuit for generating a signal indicative of the rotation of the motor, a signal generating circuit for receiving the signal from the detection circuit and generating a signal in accordance with the rotation of the motor, a first control circuit for charging and discharging the capacitor in accordance with the potential of the capacitor, the first control circuit generating a first control signal, a second control circuit for charging and discharging the capacitor in accordance with the signal generated from the position signal generating circuit, the first control signal, and the potential of the capacitor, the second control circuit generating a second control signal, and a third control circuit for performing a logic operation of the first control signal and the second control signal to control the output of a signal for exciting a coil of the motor based on the results of the logic operation.

10 Claims, 5 Drawing Sheets

DEVICE FOR PREVENTING THE BURNING OF A COIL FOR A BRUSHLESS MOTOR AND CAPABLE OF CONTROLLING THE SPEED OF THE MOTOR

BACKGROUND OF THE INVENTION

1. Field of the Invention

The present invention relates generally to a device for preventing the burning of a coil for a brushless motor, and more particularly, to a device for preventing the burning of a coil and which is capable of controlling the speed of the motor. Even more particularly, the present invention relates to a device for preventing the burning of a coil and controlling the speed of the motor using a common capacitor.

2. Description of the Related Art

In recent years, applications of small DC motors have been expanding at a very rapid pace not only in the audio industry, but also in the information industry because of their excellent controllability. Among such motors, because of the elimination of mechanically contacting parts such as a brush and a commutator and the advantage of longer life, a brushless motor has found increasing applications as an industrial motor which requires particularly high reliability.

Because of this, DC power has been replacing AC power as the driving source for small axial fans over the past several years, and DC axial fans using a brushless motor have come to be used in increasing numbers.

Also, as industrial devices such as computer-controlled devices have come to be constructed in a higher packaging density, there has been an increased need for DC axial fans for forced-air ventilation use. In addition, there has been an increase in the reliability requirements of such fans themselves. That is, in case a motor were to stop for some reason, it is required not only that the motor coil be protected against thermal damage, but also hat a possible accident be prevented by issuing some kind of warning to the control unit of the device. Moreover, the device should be automatically reset to restart the motor for proper rotation after the cause of such stopping has been eliminated.

At the same time, to satisfy the growing demand for quietness in the office, the requirement has arisen for a variable speed motor in which, when the device generates a smaller amount of heat, the rotational speed of the motor is reduced to decrease the airflow from the fan. Alternatively, when the device generates a larger amount of heat, the rotational speed of the motor is increased to increase the airflow.

A device for preventing the burning of a coil for a DC axial fan motor has been developed by the present inventors in U.S. Pat. No. 4,947,091 issued on Aug. 7, 1990. Such prevention is achieved by using the charging/discharging characteristics of a capacitor.

There have been proposals for a variable speed motor which have been presented. However, such proposals are based on the idea of constructing another circuit for the speed control which is separate from existing circuits for the motor. This will cause an increase in the number of external components, and, when such a circuit is mounted on an IC chip, the number of the terminal pins increases, resulting in a significant cost increase.

SUMMARY OF THE INVENTION

According to the present invention, a device is provided for preventing the burning of a coil for a brushless motor which is capable of controlling the speed of the motor. Such a device includes a capacitor for storing a potential; a detection circuit for generating a signal indicative of the rotation of the motor; a signal generating circuit for receiving the signal from the detection circuit and generating a signal in accordance with the rotation of the motor; a first control circuit for charging and discharging the capacitor in accordance with the potential of the capacitor, the first control circuit generating a first control signal; a second control circuit for charging and discharging the capacitor in accordance with the signal generated from the signal generating circuit, the first control signal, and the potential of the capacitor, the second control circuit generating a second control signal; and a third control circuit for performing a logic operation of the first control signal and the second control signal to control the output of a signal for exciting a coil of the motor based on the results of the logic operation.

According to the device of the present invention, a charging current from a charging circuit is set to be sufficiently larger than a charging current and a discharging current from a charging/discharging circuit. Thus, the charging circuit is activated during the normal rotation of the motor. On the other hand, when the motor is locked or stopped, the charging circuit 14 is cut off, so that the charging/discharging circuit is activated.

Thus, the invention described herein makes possible the advantage of providing an inexpensive device for preventing the burning of a coil for a brushless motor and capable of controlling the speed of the motor. The device can be mounted on an IC chip with reduced external components by using a common capacitor for preventing the burning of a coil and for the speed control of the motor.

This end other advantages of the present invention will become apparent to those skilled in the art upon reading and understanding the following detailed description with reference to the accompanying figures.

DESCRIPTION OF THE PREFERRED EMBODIMENTS

Figure 1:
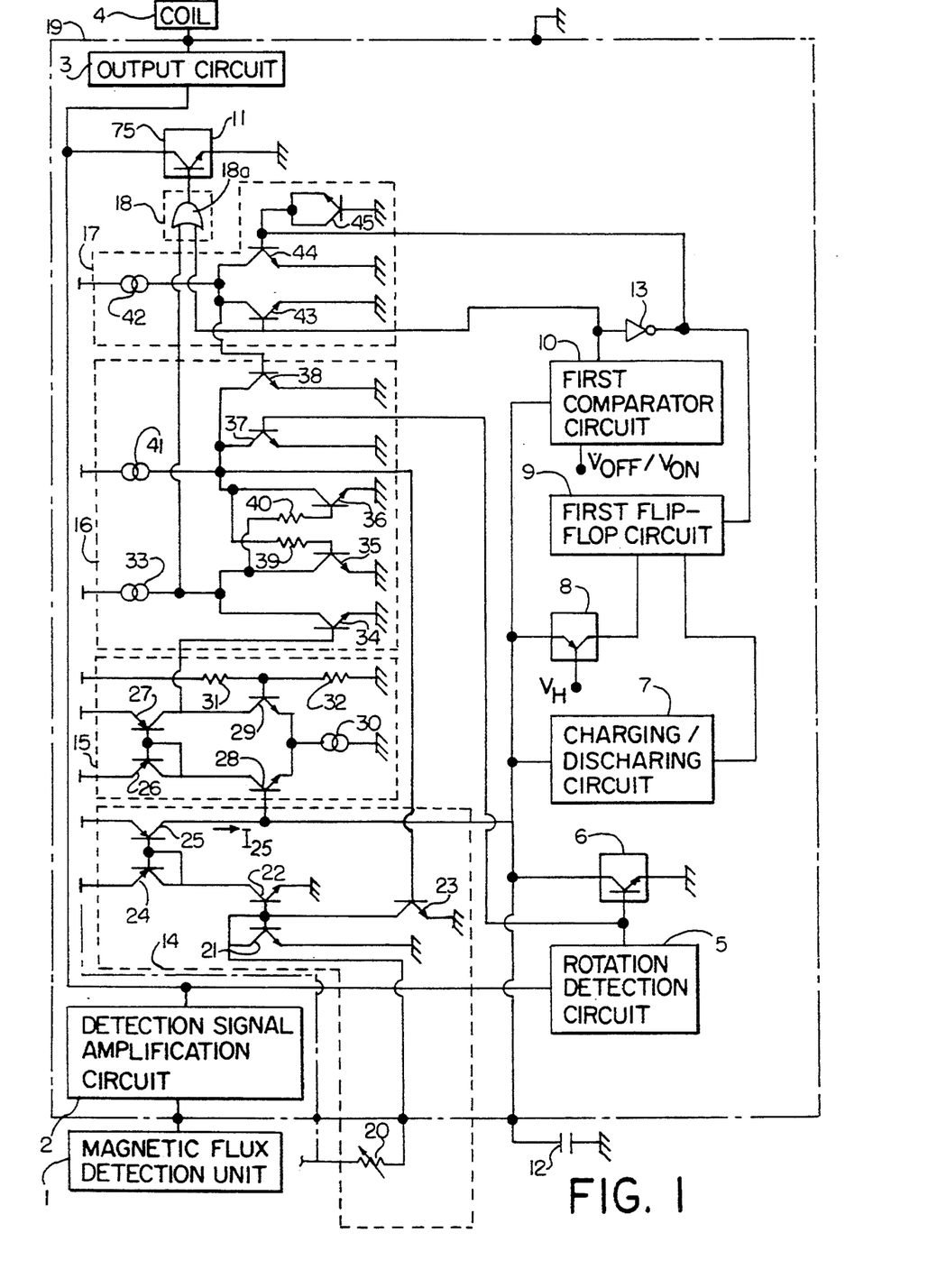
FIG. 1 is a circuit diagram of a device according to the present invention.

FIG. 1 is a circuit diagram showing the device of the present invention. Referring to FIG. 1, a magnetic flux detection unit 1, a detection signal amplification circuit 2, an output circuit 3, and a coil 4 constitute a motor for driving a fan. The motor is provided with a device for preventing the burning of a coil, e.g., the coil 4, which includes a rotation detection circuit 5, a discharging transistor 6, a charging/discharging circuit 7, an inversion detection transistor 8, a first flip-flop circuit 9, a first comparator circuit 10, a cut-off/reset circuit 11, a capacitor 12, and an inverter circuit 13. The details of these components constituting the device for preventing the burning of a coil have been disclosed by the present inventors in U.S. Pat. No. 4,947,091 as mentioned earlier. The entire disclosure of this patent is incorporated herein by reference.

Figure 4:
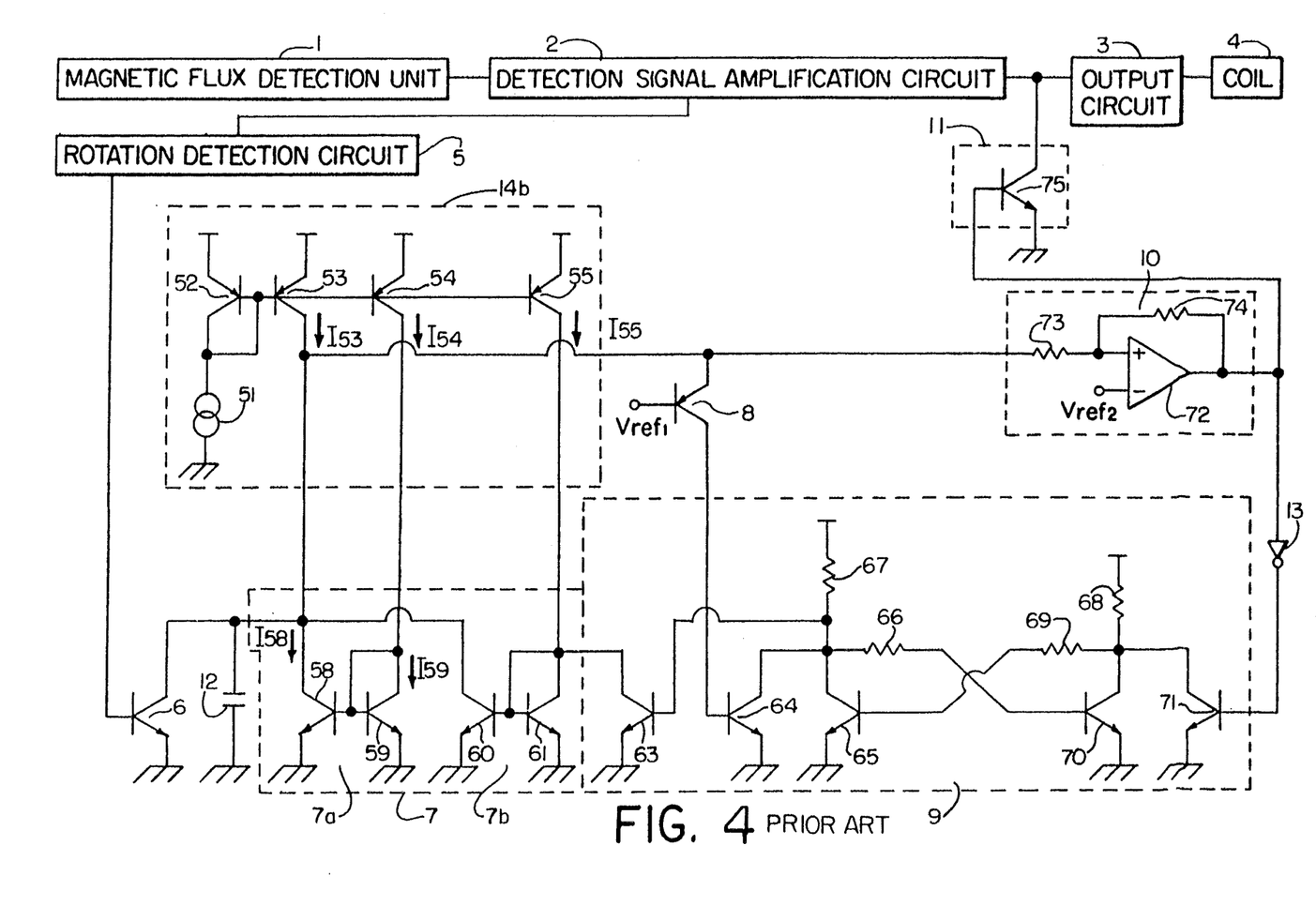
FIG. 4 is a circuit diagram of a conventional device for preventing the burning of a coil for a brushless motor.

The construction and the operation of this device will be described with reference to FIGS. 4 and 5 as follows:

Referring to FIG. 4, the rotation detection circuit 5 outputs a rotation pulse signal on receipt of a signal output from the detection signal amplification circuit 2 in synchronization with the rotation of a rotor of the motor. A constant-current circuit 14b is provided with a constant-current source 51, and transistors 52 to 55 which constitute a current mirror circuit. The transistors 53, 54, and 55 supply emitter-collector currents $I_{53}$, $I_{54}$, and $I_{55}$, respectively. The transistors 53, 54 and 55 are preferably ones which have almost the same characteristics and biased in common so as to output emitter-collector currents of the same amount, although in practice it is not necessary that they be set in such a manner.

The charging/discharging circuit 7 includes a first current mirror circuit 7a and a second current mirror circuit 7b. The first current mirror circuit 7a is provided with a pair of transistors 58 and 59. The transistors 58 and 59 supply collector-emitter currents $I_{58}$ and $I_{59}$, respectively. The amount of the collector-emitter current $I_{59}$ is equal to that of the emitter-collector current $I_{54}$. The currents $I_{58}$ and $I_{59}$ are slightly different from each other in a relationship of $I_{58} < I_{59}$. The difference between the collector-emitter current $I_{58}$ and the emitter-collector current $I_{53}$ can be a charge current to the capacitor 12. The collector of the transistor 58 is connected to the collector of the transistor 53, while the collector of the transistor 59 is connected to the collector of the transistor 54. The second current mirror circuit 7b is provided with another pair of transistors 60 and 61, ones which have almost the same characteristics and biased in common so as to supply collector-emitter currents in a relationship of $I_{60} = 2(I_{59} - I_{58})$. The collector of the transistor 60 is connected to the collector of the transistor 58, while the collector of the transistor 61 is connected to the collector of the transistor 55. The transistors 58 to 61 may be designed so that the transistors 53, 54, and 55 respectively supply the emitter-collector currents $I_{53}$, $I_{54}$, and $I_{55}$ of the same amount.

The first flip-flop circuit 9 comprises resistors 66 to 69, transistors 65 and 70, a first input transistor 64, a second input transistor 71, and an output transistor 63. The collector of the output transistor 63 is connected to the collector of the transistor 61 of the second current mirror circuit 7b. The base of the inversion detection transistor 8 is connected to reference voltage $V_{ref1}$, while its emitter and collector are connected to the collector of the transistor 53 and the base of the first input transistor 64, respectively. In this embodiment, a voltage $V_{OFF}$ is defined as a potential of the capacitor 12 at the time when the output circuit 3 is to turn OFF after the motor is locked or stopped by an external cause. A voltage $V_{BE}$ is defined as a base-emitter voltage of the inversion detection transistor 8. A voltage $V_{ON}$ is defined as a restart voltage of the motor. In this embodiment, $V_{ref1}$ equals the difference between a predetermined voltage level $V_H$ which is higher than $V_{OFF}$ and $V_{BE}$ ($V_{ref1} = V_H - V_{BE}$).

The first comparator circuit 10 comprises a comparator 72 having hysteresis determined by resistors 73 and 74. The cut-off/reset circuit 11 comprises a transistor 75. The non-inverted input terminal of the comparator 72 is connected through the resistor 73 to the collector of the transistor 53, and the inverted input terminal is connected to reference voltage $V_{ref2}$ which is higher than $V_{ON}$ and lower than $V_{OFF}$ ($V_{ON} < V_{ref2} < V_{OFF}$). The output of the comparator 72 is connected to the base of the transistor 75 and, through the inverter circuit 13, to the base of the second input transistor 71 of the first flip-flop circuit 9. The collector of the transistor 75 is connected to the line supplying an input signal to the output circuit 3. The collector and base of the discharging transistor 6 are connected to the capacitor 12 and the output of the rotation detection circuit 5, respectively.

Figure 5:
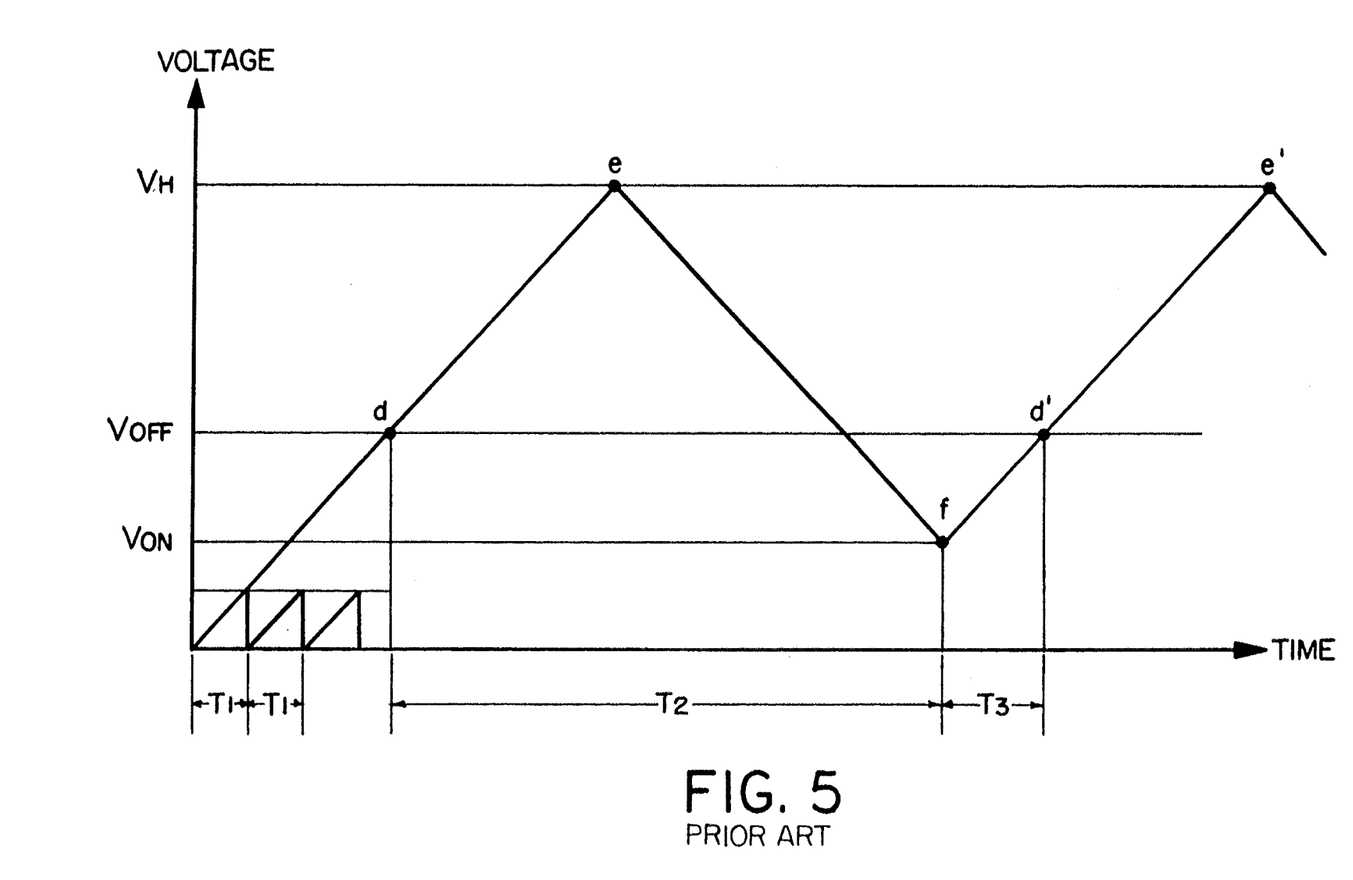
FIG. 5 is a graph showing the characteristics of the device of FIG. 4.

With reference to FIG. 5, the operation of the device of FIG. 4 will be described. When the rotor begins to turn, initially the potential of the capacitor 12 is 0 V, for example, and the inversion detection transistor 8 is OFF so that the output of the comparator 72 is LOW, resulting in that the first input transistor 64 is OFF and the second input transistor 71 is ON. The output transistor 63 is forward biased via the resistor 67, and draws the current from the transistor 55 to disable the second current mirror circuit 7b. The capacitor 12 is charged with the current ($I_{59} - I_{58}$) so that its potential rises. In a normal rotation of the motor, the rotation pulse signal is generated at intervals of $T_1$. In synchronization with the rotation pulse signal, the discharging transistor 6 is turned ON to discharge the capacitor 12, thus preventing the potential of the capacitor 12 from further rising. This allows the normal rotation of the motor to continue.

When the rotation of the motor stops due to an external cause such as an undue load on the motor shaft, the rotation detection circuit 5 stops generating the rotation pulse signal. When the rotation detection circuit 5 stops generating the rotation pulse signal, the discharging transistor 6 is not forward biased or turned ON. As the discharging transistor 6 is OFF and the capacitor 12 is charged based on a function of the first current mirror circuit 7a, the potential of the capacitor 12 rises to reach a point d ($=V_{OFF}$). At this time, the output terminal of the comparator 72 becomes HIGH to turn on the transistor 75, so that the output circuit 3 is deenergized to prevent an overcurrent from flowing through the coil 4. This prevents the coil from burning due to such an overcurrent.

The potential of the capacitor 12 further rises. When the potential reaches a point e, i.e. $V_H = (V_{ref1} + V_{BE})$, the inversion detection transistor 8 is turned ON to turn the first input transistor 64 ON, which turns OFF the output transistor 63. This enables operation of the second current mirror circuit 7b to discharge the capacitor 12 with the current of $-(I_{59} - I_{58})$. As a result, the potential of the capacitor 12 drops. When the potential drops to a point f ($=V_{ON}$) as is shown in FIG. 5, the output of the comparator 72 becomes LOW to turn OFF the transistor 75 and turn ON the second input transistor 71 via the inverter circuit 13. This causes the output circuit 3 to be activated, and inverts the first flip-flop circuit 9 to output state to the charging/discharging circuit 7 via the output transistor 63. As a result, the coil 4 is excited again, and the output transistor 63 is turned ON. When the output transistor 63 is ON, the operation of the second current mirror circuit 7b is stopped. At this time, if the external cause has been removed thus allowing the motor to rotate freely, for example, the rotation pulse signal is generated so that the capacitor 12 is discharged through the discharging transistor 6, and the motor returns to normal rotation. In contrast, if the external cause has not been removed, the above operation is repeated. As a result, even when the rotation of the motor is stopped due to an external cause, the current provided through the coil 4 will not exceed a predetermined level. This level can be designed so as to be well within the current handling capabilities of the coil 4 to avoid burning of the coil 4.

Referring again to FIG. 1, according to the present invention, the above device for preventing the burning of a coil further includes a charging circuit 14, a second comparator circuit 15, a second flip-flop circuit 16, a pulse circuit 17, and an OR circuit 18, so as to effect speed control of the motor.

The charging circuit 14 includes a variable resistor 20 such as a potentiometer, pairs of transistors 21 and 22 and 24 and 25, each constituting a current mirror circuit, and a transistor 23. A speed of the motor is varied by changing the duty cycle of a pulse to be supplied with the motor. The capacitor 12 is charged or discharged in a short time to vary the duty cycle of a pulse to be supplied with the motor. The charging circuit 14 is designed to operate at a sufficiently larger amount of current $I_{25}$ than the charging current and the discharging current of the charging/discharging circuit 7, and its supply of the current to the capacitor 12 is turned ON and OFF through the transistor 23. The collector of the transistor 25 is connected to the positive terminal of the capacitor 12.

Figure 3A:
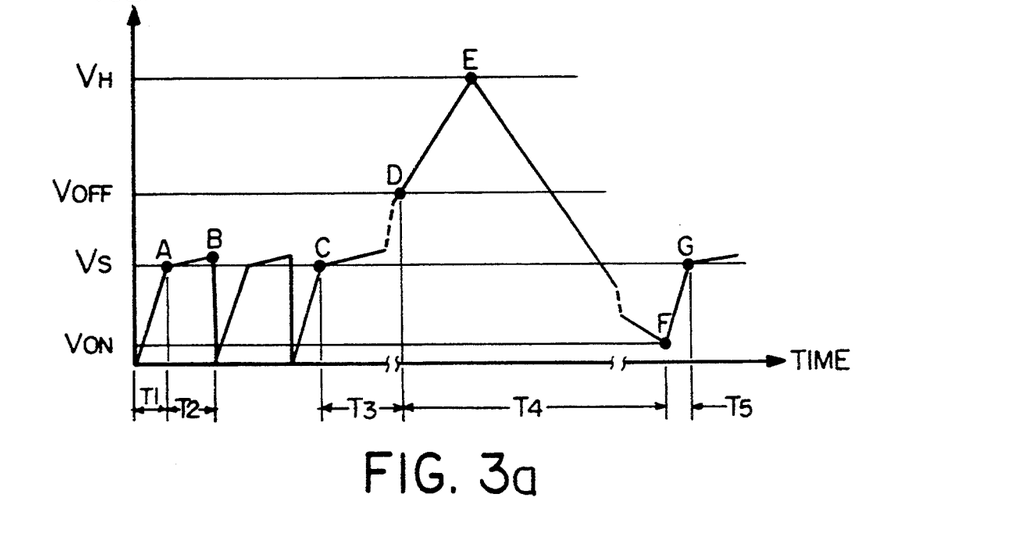
FIG. 3a is a graph showing the exemplary characteristics of the device of FIG. 1 according to the present invention.
Figure 3B:
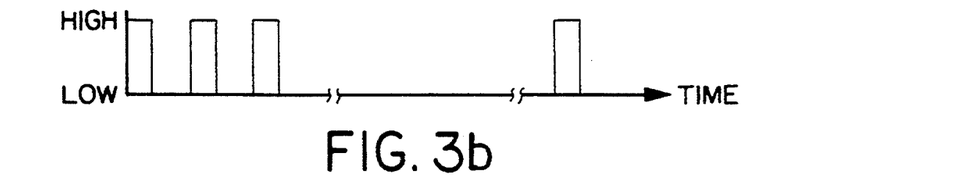
FIGS. 3b to 3e are representative waveforms output from a first flip-flop circuit, a second comparator circuit, an OR circuit, and an output circuit of the device of FIG. 1, respectively, according to the present invention.
Figure 3C:
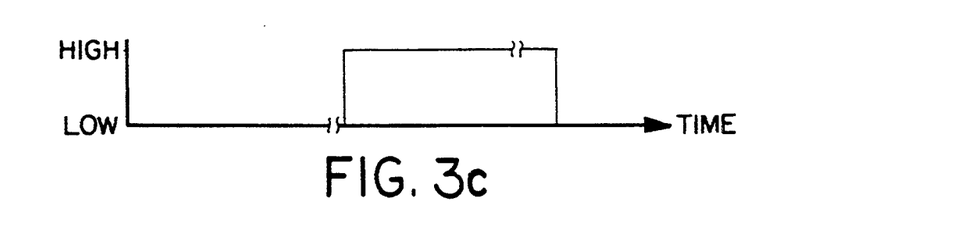
Figure 3D:
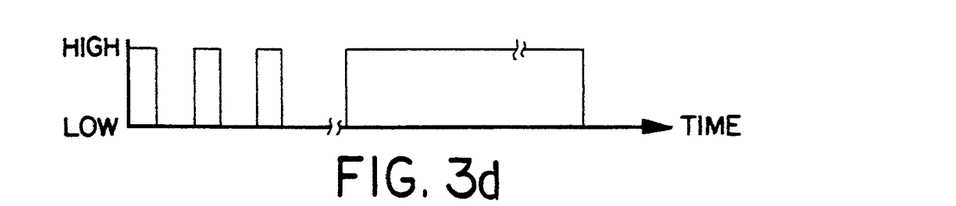
Figure 3E:
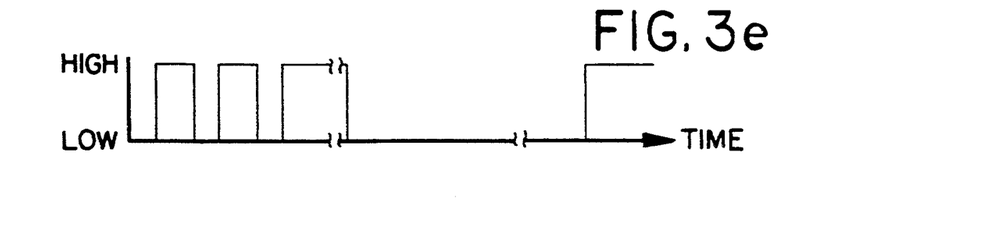

The second comparator circuit 15 includes a pair of transistors 26 and 27 constituting a current mirror circuit, a pair of transistors 28 and 29 constituting a differential amplification circuit, a constant-current source 30, and resistors 31 and 32. A first predetermined potential $V_s$ shown in FIG. 3 is set with the resistors 31 and 32. The base of the transistor 28 is connected to the positive terminal of the capacitor 12.

The second flip-flop circuit 16 includes transistors 34 to 38, resistors 39 and 40, and constant-current sources 33 and 41. The base of the transistor 34 is connected to the collector of the transistor 27, and the base of the transistor 37 is connected to the output of the rotation detection circuit 5.

The pulse circuit 17 includes transistors 43 and 44, a capacitor 45 formed the capacitance between poles of a transistor, and a constant-current source 42. The collectors of the transistors 43 and 44 are connected to the base of the transistor 38, the base of the transistor 43 is connected to the output of the first comparator circuit 10, and the base of the transistor 44 is connected to the output of the inverter circuit 13.

The OR circuit 18 includes an OR gate 18a having a first input terminal connected to the common collectors of the transistors 34 and 35, a second input terminal connected to the output of the first comparator circuit 10, and an output terminal connected to the input of the cut-off/reset circuit 11.

All of these components shown in the figures for making up the motor, except the magnetic flux detection unit 1, the coil 4, the capacitor 12, and the variable resistor 20, can be integrated and formed on an IC chip 19.

Figure 2:
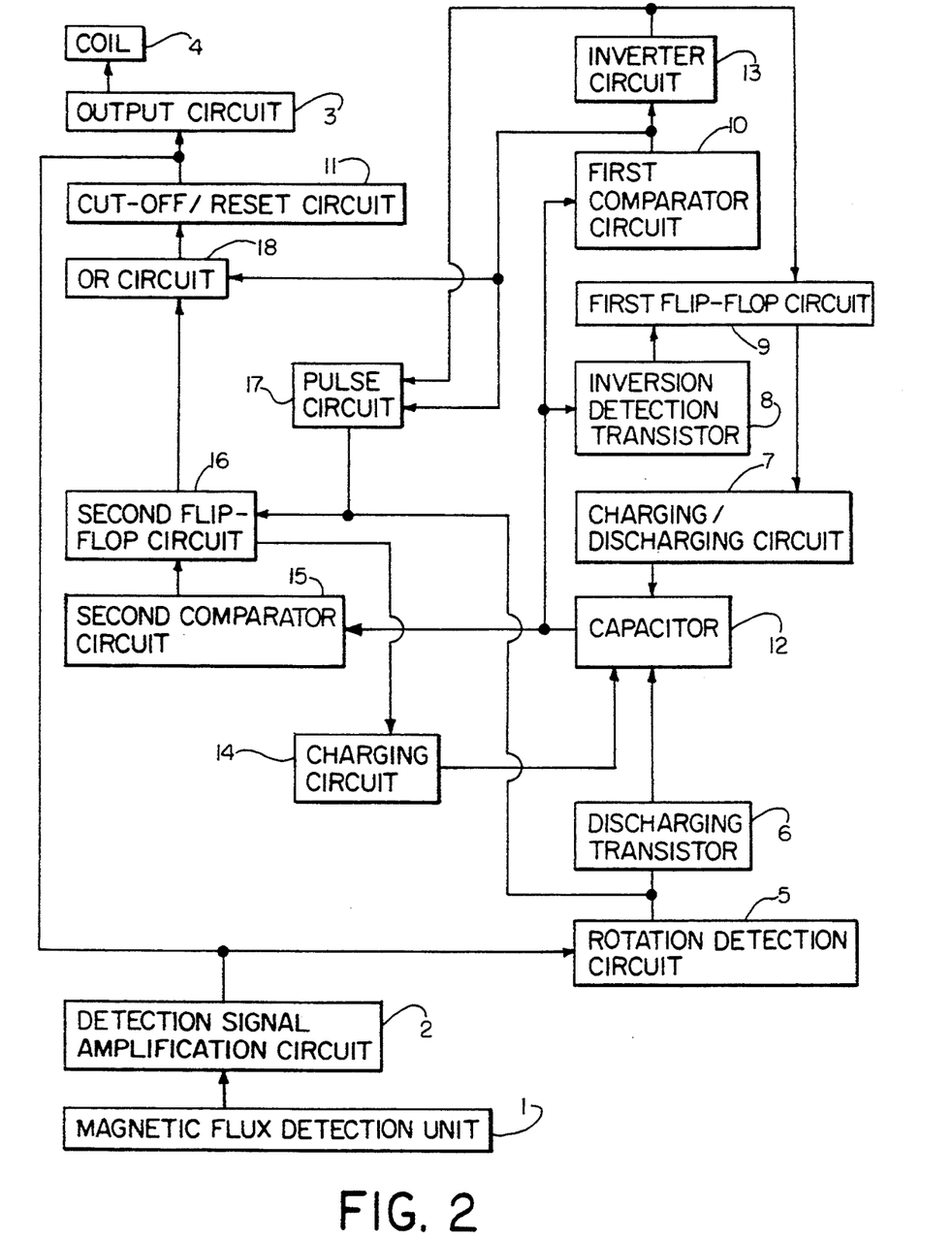
FIG. 2 is a block diagram of the device of FIG. 1 according to the present invention.

Now, with reference to FIGS. 2 and 3a, the operation of the device according to the present invention will be described.

At the start of the operation of the motor, the potential of the capacitor 12 is 0 V, so that the output of the first comparator circuit 10 is LOW as described above. As a result, the pulse circuit 17 outputs a reset pulse to the base of the transistor 38 which resets the second flip-flop circuit 16 to a HIGH output state at the common collectors of the transistors 34 and 35. Thus, the output of the OR circuit 18 becomes HIGH, the cut-off/reset circuit 11 is turned ON, and the output circuit 3 is turned OFF. In this state, the coil 4 is kept unexcited. When the output of the first comparator circuit 10 is LOW, the transistor 43 is OFF. When the transistor 43 is OFF, the transistor 38 is ON. When the transistor 38 is ON, the transistor 23 is OFF. When the transistor 23 is OFF, the transistors 21 and 22 are ON. When the transistors 21 and 22 are ON, the transistors 24 and 25 are ON. When the transistor 25 is ON, the capacitor 12 is charged by the current $I_{25}$. As described above, the charging circuit 14 is activated to charge the capacitor 12. The potential of the capacitor 12 reaches the first potential $V_s$. Power-supply voltage is divided to provide the first potential $V_s$ by resistors 31 and 32. When the base voltage of the transistor 28 becomes higher than the first potential $V_s$, the second comparator circuit 15 is activated to change the output state of the second flip-flop circuit 16, thereby to stop the capacitor 12 from being charged.

As a result of the output of the transistor 34 of the second flip-flop circuit 16 becoming LOW, the output of the OR circuit 18 becomes LOW, the cut-off/reset circuit 11 (transistor 75) is turned OFF, and the output circuit 3 is thereby turned ON such that the coil 4 is activated to rotate the rotor. When the rotor rotates, the rotation detection circuit 5 outputs a train of pulses. Upon receipt of each of these pulses, the discharging transistor 6 is turned on to discharge the capacitor 12. At the same time, the second flip-flop circuit 16 is reset to restart the charging of the capacitor 12.

As described above, the output circuit 3 is turned ON and OFF repeatedly, thereby to activate and deactivate current through the coil 4 correspondingly. At this time, the amount of the current supplied from the charging circuit 14 to the capacitor 12 can be appropriately adjusted by means of the variable resistor 20, to change the ON/OFF duty cycle at the output circuit 3, and thereby to change the rotation speed of the rotor. The variable resistor 20 may be replaced with a fixed resistor of which resistance is fixed to a value in accordance with a desired rotation speed of the rotor.

When the rotor is locked due to an external cause, the rotation detection circuit 5 does not generate an output pulse, which causes the capacitor 12 to be additionally charged through the charging/discharging circuit 7 as is described above. When the potential of the capacitor 12 rises to reach a second predetermined potential $V_{OFF}$, the output of the first comparator circuit 10 becomes HIGH. Then, the cut-off/reset circuit 11 is turned ON through the OR circuit 18 to turn the output circuit 3 OFF. When the capacitor 12 is further charged to reach a potential $V_H$, the inversion detection transistor 8 is turned on, which sets the charging/discharging circuit 7 to the state for discharging the capacitor 12 through the first flip-flop circuit 9. As a result, the potential of the capacitor 12 starts to drop. When the potential drops to a third predetermined potential $V_{ON}$ which is lower than the first potential V$_S$, the output of the first comparator circuit 10 becomes LOW, resulting in that the pulse circuit 17 generates a reset pulse which resets the second flip-flop circuit 16. This operation is repeated until the external cause is removed.

FIGS. 3b, 3c, 3d, and 3e show waveforms output from the second flip-flop circuit 16, the first comparator circuit 10, the OR circuit 18, and the output circuit 3, respectively. The output signals from the second flip-flop circuit 16 and the first comparator circuit 10 are input into the OR circuit 18. When the output state of the OR circuit 18 is HIGH, the output signals from the detection signal amplification circuit 2 is cut-off by the cut-off/reset circuit 11. When the input signal into the output circuit 3 is cut-off, the output state of the output circuit 3 is LOW.

Thus, according to the present invention, a device for preventing the burning of a coil for a brushless motor capable of controlling the speed of the motor can be obtained by adding a small number of circuits to the device disclosed in U.S. Pat. No. 4,947,091 mentioned earlier without the necessity of providing additional external components.

Though the above example shows the magnetic flux detection unit 1 as being disposed outside the IC chip 19, it is also possible to mount the magnetic flux detection unit 1 on the IC chip 19.

The variable resistor 20 may be replaced with a temperature detecting element (e.g., a thermistor), thereby automatically controlling the motor in response to variations in the ambient temperature to vary the airflow from the fan.

As described above, according to the device of the present invention, a single capacitor can be utilized for the both purposes of preventing the burning of a coil for the motor and the speed control of the motor. The device according to the present invention can be obtained at low cost by adding a small number of circuits for the speed control of the motor to a device for preventing the burning of a coil for the motor. The device of the present invention neither necessitates additional external components nor causes the increase in the number of terminal pins.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A device for preventing the burning of a coil for a brushless motor and capable of controlling the speed of the motor, said device comprising:
    a capacitor means for storing a potential;
    a detection means for generating a signal indicative of the rotation of said motor, and for amplifying the signal indicative of the rotation of said motor;
    a signal generating means for receiving the amplified signal from said detection means and generating a rotation signal in accordance with the rotation of said motor;
    a first control means for charging and discharging said capacitor means in accordance with the potential of said capacitor means, said first control means generating a first control signal;
    a second control means for charging and discharging said capacitor means in accordance with the rotation signal generated from said signal generating means, and the potential of said capacitor means, said second control means generating a second control signal; and
    a third control means for performing a logic operation of said first control signal and said second control signal to control the output of a signal for exciting a coil of said motor based on the results of said logic operation such that the speed of the motor is controlled while preventing burning of the coil.

2. A device according to claim 1, wherein said detection means comprises:
    a magnetic flux detection unit for detecting the rotation of the rotor of said motor; and
    an amplification means for amplifying a signal output from said magnetic flux detection unit.

3. A device according to claim 1, wherein said first control means comprises:
    a charging/discharging means for supplying or draining a current to or from said capacitor means when the generation of the rotation signal from said signal generating means stops, said current being obtained by superimposing a discharging current from said capacitor means upon a charging current to said capacitor means;
    an indicating signal generating means for generating a signal indicative of charging or discharging said capacitor means to said charging/discharging means; and
    a comparison means for detecting the rise of the potential of said capacitor means to a first predetermined potential and the drop thereof to a second predetermined potential.

4. A device according to claim 1, wherein said second control means comprises:
    a charging means for charging said capacitor means in accordance with the rotation signal generated from said signal generating means; and
    a comparison means for signaling said charging means to stop charging said capacitor means when the potential of said capacitor means reaches a predetermined potential.

5. A device according to claim 1, wherein said third control means comprises:
    an OR circuit; and
    a transistor for shunting a transmission line.

6. A motor control device, comprising:
    a capacitor for storing a potential;
    first means for controlling an excitation current provided to a coil in a motor to prevent burning of said coil, said means for controlling being operative as a function of the potential of said capacitor;
    second means for controlling said excitation current provided to said coil to regulate a rotational speed of said motor, said regulation being a function of said potential of said capacitor;
    means for detecting rotation of said motor and generating a rotation pulse signal in accordance with the rotation of the motor, and wherein
    said first means for controlling includes first means for charging and discharging said capacitor as a function of the potential of said capacitor, and means for generating a first control signal indicative of the potential of said capacitor; and
    said second means for controlling includes second means for charging and discharging said capacitor as a function of said rotation pulse signal and the potential of said capacitor, said second control means further including means for generating a second control signal and means for activating and deactivating said excitation current output to said coil by an excitation circuit based on said first and second control signals.

7. A device according to claim 6, wherein said means for activating and deactivating includes means for performing a logic operation on said first and second control signals.

8. A device according to claim 7, wherein said means for performing includes an OR circuit.

9. A device according to claim 6, wherein said second means for charging and discharging includes a variable resistor for controlling the rate of charging said capacitor.

10. A device according to claim 6, wherein said second means for charging and discharging said capacitor includes a temperature sensing element for controlling the rate of charging said capacitor as a function of temperature.

* * * * *